United States Patent [19]
Young, Jr.

[11] 3,942,842
[45] Mar. 9, 1976

[54] INDUSTRIAL VACUUM LOADING APPARATUS

[76] Inventor: Henry T. Young, Jr., 34 Marlborough St., Montgomery, Ala. 36109

[22] Filed: Aug. 3, 1971

[21] Appl. No.: 168,579

[52] U.S. Cl. .................. 302/62; 302/11; 302/59
[51] Int. Cl.² ........................................ B65G 53/60
[58] Field of Search ..................... 302/59, 62, 28

[56] References Cited
UNITED STATES PATENTS

| | | | |
|---|---|---|---|
| 507,773 | 10/1893 | Bachman et al. | 302/62 X |
| 521,159 | 6/1894 | Garraux | 302/62 X |
| 743,814 | 11/1903 | Boyd | 302/62 X |
| 1,417,052 | 5/1922 | Gasteiger | 302/59 X |
| 1,448,430 | 3/1923 | Brown | 302/62 X |
| 3,480,330 | 11/1969 | Hirs et al. | 302/28 |

FOREIGN PATENTS OR APPLICATIONS 302,412  12/1928  United Kingdom .................. 302/59

*Primary Examiner*—Evon C. Blunk
*Assistant Examiner*—Jeffrey V. Nase
*Attorney, Agent, or Firm*—Browne, Beveridge, DeGrandi & Kline

[57] ABSTRACT

A vacuum operated industrial loading apparatus employing an exhaust fan and an elongated flexible inlet hose for breaking up material to be loaded, and including a self-sealing separation chamber and apparatus for continuously removing material picked up by the suction of the blower. The material removed from the flow of air through the vacuum system may be deposited into an open bin, conveyed from the apparatus, or otherwise disposed of.

3 Claims, 3 Drawing Figures

U.S. Patent   March 9, 1976   3,942,842
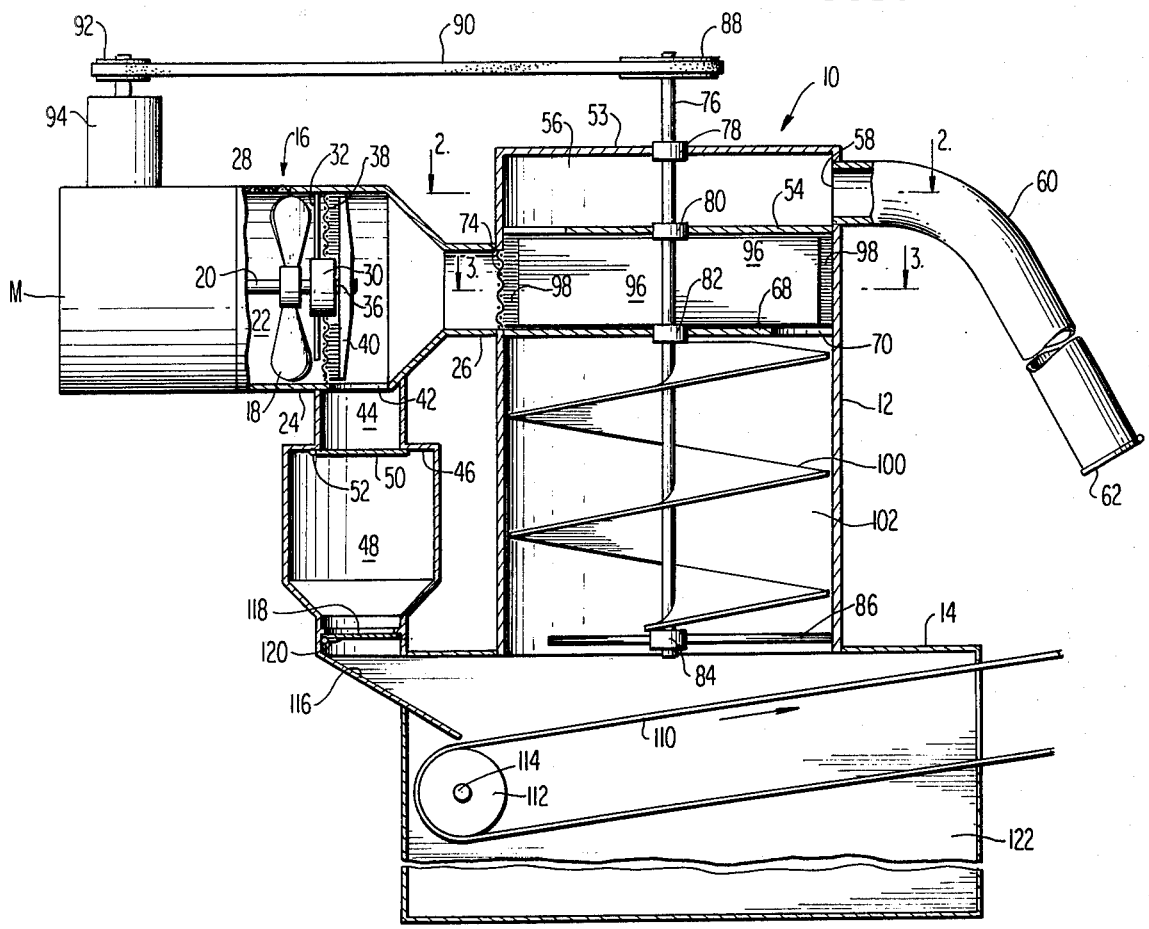
FIG.1
FIG.2
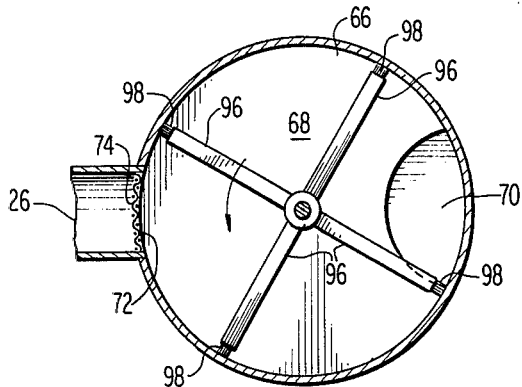
FIG.3
INVENTOR
HENRY T. YOUNG, JR.
BY Beveridge & DeGrandi
ATTORNEYS

INDUSTRIAL VACUUM LOADING APPARATUS

BACKGROUND OF THE INVENTION

1. Field of the Invention

This invention relates to industrial vacuum loading devices, and more particularly, to an improved power driven vacuum loading apparatus including a material filtration and a separation means for continuously removing solid material from the flow of air through the vacuum system while the apparatus is in operation.

2. Description of the Prior Art

Numerous devices have, in the past, been developed for handling substantial volumes of solids by use of vacuum. Typical of such prior art devices are industrial vacuum cleaners, debris collectors, and street sweeping machines as well as systems such as that disclosed in U.S. Pat. No. 2,776,171 for handling finely divided solids. However, use of these devices has generally been limited to applications when the material handled was to be collected in a closed, sealed hopper, filter chamber, bag or the like, or wherein the nature of the material handled was such that it could readily be permitted to pass through the suction-creating section of the system and be discharged with the exhaust air. Thus, it has generally not been possible to use these devices in continuous loading or material handling operations wherein it is desired to extract the solids from the stream of air moving through the vacuum system, as for loading into an open bin or truck, or to be deposited on a conventional mechanical conveyor system. Efforts have been made to overcome this limitation on the use of such vacuum devices by the use of cyclone separators or the like in conjunction with the vacuum lifting apparatus, but such devices are not satisfactory for many materials and are prohibitively bulky and expensive for many operations.

SUMMARY OF THE INVENTION

The present invention provides a power-driven suction type industrial loading apparatus capable of lifting various solid materials by the use of vacuum and provides an improved, simplified means for removing the solids so lifted from the flow of air through the vaccum system during continuous operation of the apparatus and without loss of vacuum. For example, the device may readily be employed in the handling of solid material such as grain or the like by picking up the material through the open end of a flexible inlet hose of conduit, continuously separating the solid material so picked up, and depositing the material into an open bin, truck, or the like for subsequent handling. This is accomplished by providing a screen in the flow path for the material between the inlet nozzle and the exhaust fan, and by providing an air-lock conveying means for removing the material from the screen and conveying it out of the system while maintaining the system sealed against ambient air presure.

BRIEF DESCRIPTION OF THE DRAWINGS

The foregoing and other advantages of the invention will become apparent from the detailed description contained herein taken in conjunction with the drawings, in which:

FIG. 1 is an elevational view, partially in section, of an improved vacuum loading apparatus according to the present invention;

FIG. 2 is a sectional view taken on line 2—2 of FIG. 1; and

FIG. 3 is a sectional view taken on line 3—3 of FIG. 1.

DESCRIPTION OF THE PREFERRED EMBODIMENT

Referring now to the drawings in detail, an improved vacuum operated loading device according to the present invention is indicated generally by the reference numeral 10, and includes a main housing 12 supported on and projecting above a horizontal platform 14. Mounted on the side of housing 12 is an exhaust fan assembly indicated generally by the reference numeral 16 and including a fan 18 mounted on a shaft 20 which, in turn, is driven by suitable power source, or motor M. Fan 18 is journalled for rotation within a cylindrical chamber 22 defined by the housing 24 and having an inlet section 26 rigidly mounted on the side of housing 12. Chamber 22 has an outlet covered by a safety screen 28 to provide an exhaust for air drawn through the apparatus by the fan 18.

The forward end of shaft 20 is supported by and drives reduction gear assembly 30 supported centrally within the exhaust fan housing 24 by a spider support structure 32, and a filter screen 34 is rigidly mounted within the chamber 22 forward of the spider 32. A stub shaft 36 projects outwardly from reduction gear assembly 30 and supports a brush assembly 40 for rotation thereon, with the brush in contact with screen 38 to dislodge any filtered material collected thereon. Material dislodged from screen 38 is permitted to fall, by gravity, through an opening 42 in housing 24 into a first trap chamber 44 mounted upon the top wall 46 of a second closed trap chamber 48. The bottom wall 50 of trap chamber 44 is hingedly mounted by a spring hinge 52 and normally retained in the closed position illustrated in FIG. 1 by the spring hinge 52. However, upon collection of sufficient material within the chamber 44 the weight thereof will cause the wall 50 to pivot downwardly and allow the materials swept from the screen 38 to drop into the sealed second collection chamber 48, with the hinged wall 50 thereafter returning to its closed position as shown.

The main housing 12 of the apparatus is generally cyclindrical in cross section as shown in FIGS. 2 and 3, and has its top end closed by a rigid wall 53. A second wall 54 rigidly mounted within housing 12 in vertically spaced relation to end wall 53 defines a first chamber 56 within the housing. Chamber 56 has an opening 58 in the side wall thereof, and an elongated, flexible inlet hose 60 has one end secured within opening 58. Inlet hose 60 preferably has a normally opened, manually closable butterfly valve 62 mounted on its inlet end to permit evacuation of the apparatus during start-ups or for test purposes.

As best seen in FIG. 2, the bottom wall 54 of chamber 56 has an opening 64 in the side thereof opposite the opening 58 so that material passing through the inlet conduit 60 into chamber 54 will be permitted to drop through the opening 64 into a second chamber 66 defined by a wall 68 spaced vertically below the wall 54. Wall 68 has an opening 70, similar to opening 64 in wall 54 and located on the opposite side of housing 12. Chamber 66 has a second outlet 72 leading to the inlet portion 26 of the exhaust fan housing 24, with outlet 72 being covered by a rigid filter screen 74. An elongated, vertically extending shaft 76 is journalled for rotation centrally within the cylindrical housing 12 by bearings 78, 80 and 82, respectively, mounted within openings in walls 53, 54, and 68, and by bearing 84 supported by a spider assembly 86 rigidly mounted within the bottom open end of housing 12. Shaft 76 is driven for rotation about its vertical axis by a pulley 88 and belt 90 which, in turn, is driven, through pulley 92, by a gear reduction 94 mounted on and driven by motor M.

A paddle wheel assembly is rigidly mounted on shaft 76 for rotation therewith within chamber 68. The paddle wheel assembly includes four radially extending arms 96 each having a relatively stiff brush assembly 98 rigidly mounted on the outer end thereof with the brushes in contact with the inner surface of the cylindrical wall of housing 12 and in contact with the inner surface of filter screen 74. The paddle wheel assembly is dimensioned to substantially completely occupy the vertical dimension of the chamber 68 to provide an effective vacuum seal between the opening 70 in wall 68 and the opening 72.

A relatively low-pitch auger or screw conveyor 100 is mounted on shaft 76 within the lower cylindrical portion 102 of housing 12 between the spider 86 and the wall 68. Auger 100 is intended to impede the fall of material passing through the opening 70, permitting the material to build up and to substantially fill the chamber 102 to aid in the vacuum seal provided by the paddle wheel assembly.

A conveyor, including a belt 110, driven by a roller 112 mounted on a shaft 114 is positioned directly beneath the open bottom end of the chamber 102 in position to convey material loaded by the apparatus to any desired location as into a waiting truck or the like. Also, a chute, or guide, 116 is provided leading from the bottom of trap chamber 48 to permit material from the trap chamber to flow, by gravity, onto the conveyor belt 110 upon opening of the bottom wall 118 of the trap chamber 48. Preferably wall 118 is supported by a spring biased hinge 120 to retain the wall 118 in the closed position shown until a sufficient weight of material is collected in the trap chamber. Alternatively, a manually-controlled lever-actuated latch mechanism may be provided to open the wall 118 to permit material in the chamber 48 to flow onto the conveyor.

In operation of the vacuum loading device according to this invention, the motor M driving the high-speed fan 18 will create a vacuum within the apparatus causing a flow of air through the inlet conduit 60 into the upper chamber 56, drawing with it solid materials to be loaded by the apparatus. Upon reaching the enlarged chamber 56, the solid materials will be slowed somewhat due to the reduced velocity of air passing through the enlarged chamber, and will then drop or be drawn through the opening 64 into the chamber 66. Since opening 64 is positioned directly above the outlet 72 and screen 74, the flow of air through outlet 72 will cause the major portion of the solid material to be trapped on the screen 74. This trapped solid material will then be swept from the face of the filter screen by the brushes 98 and carried around the chamber 66 to the opening 70 where it will drop onto the auger 100. Due to the relatively low pitch of the auger 100, the solid materials will tend to pile up within the auger and thereby act as a partial vacuum seal and thereby reduce the tendency of air to flow upward through the open bottom end of housing 12 through the opening 70. If desired, the pitch of auger 100 may be increased near its upper end to assure that the solid material will fall through opening 70. Thus, the auger 100 cooperates with the paddle wheel assembly to provide an efficient air lock conveying system for removing the solid materials from the vacuum system without permitting the back flow of air into the system to reduce the efficiency of the vacuum in picking up the solid material through the inlet conduit 60.

Any small quantity of solid materials which may pass through the primary filter screen 74 will tend to be trapped on the secondary filter screen 38 before reaching the fan 18. If desired, this secondary filter screen 38 may be of a smaller mesh to assure that solids passing the primary filter screen will be trapped on this secondary screen for subsequent removal by the brush assembly 40 into the trap chambers 44 and 48.

As is apparent from FIG. 1, solid materials separated from the air stream passing through the apparatus is permitted to drop by gravity from the outlet end of the chamber 102 and from the secondary trap chamber 48. Since this material is no longer subjected to the influence of the vacuum of the apparatus, it may be handled in any conventional manner. In the instant application, the belt conveyor 110 is illustrated as conveying the separated material from the apparatus for deposit at a position remote therefrom. To illustrate the versatility of the apparatus, the conveyor is illustrated as being generally mounted at the top of an open bin or hopper indicated generally by the reference 122. Thus it is apparent that the equipment is extremely versatile and may readily be employed in permanent installations or adapted for use as an integral part of a mobile material handling apparatus.

While I have disclosed and described a preferred embodiment of my invention, I wish it understood that I do not intend to be restricted solely thereto, but rather that I intend to include all embodiments thereof which would be apparent to one skilled in the art and which come within the spirit and scope of my invention.

I claim:

1. In a vacuum operated industrial loading apparatus of the type including a vacuum conduit system having an open inlet and exhaust fan means for creating a flow of air through the system from the open inlet, an enlarged separation chamber having an inlet and an air outlet connected in the conduit system and a material discharge outlet in the bottom wall thereof and spaced from the air outlet, a first filter screen mounted over the air outlet for filtering a solid material from air flowing through the separation chamber and a paddle wheel assembly mounted for rotation about a fixed axis within the separation chamber and including a plurality of radially extending arms cooperating with the walls of the separation chamber to define a plurality of individual conveyor chambers each movable successively past the filter screen to remove solid materials collected thereon and the discharge outlet to discharge the removed materials while maintaining at least a partial air lock between the material discharge outlet and the air outlet, the improvement comprising secondary air lock means including an elongated conduit having one end positioned over and communicating with said discharge outlet, said conduit extending downwardly from said bottom wall and terminating in an open bottom end, an elongated screw conveyor mounted within said conduit, said screw conveyor having a low pitch and normally acting to retard the flow of solid materials deposited into the upper end of said conduit and onto said conveyor through said discharge outlet by said paddle wheel assembly, and drive means for rotating said screw conveyor to convey the solid materials downwardly through said conduit to be discharged through said open bottom end whereby solid materials deposited onto said screw conveyor collect thereon and cooperate therewith to form said secondary air lock between said air outlet and the open end of said conduit, and wherein said separation chamber comprises a substantially cylindrical upright housing having a substantially cylindrical side wall and top and bottom end walls and having an opening in said side walls defining said air outlet, said filter screen being mounted over said air outlet in said side wall, said inlet being formed in said top wall and said discharge outlet being formed in said bottom wall at a point circumferentially spaced from said inlet and from said air outlet.

2. The vacuum operated industrial loading apparatus as defined in claim 1 wherein said housing comprises a second substantially cylindrical chamber mounted on and projecting upwardly from said top end wall and having an inlet opening formed in the side wall thereof at a point spaced circumferentially from said opening in said top wall and connected to said conduit system whereby air flowing through said conduit system flows into and through said second chamber before passing downwardly through said inlet to said filter screen.

3. The vacuum operated industrial loading apparatus as defined in claim 1 wherein said paddle wheel assembly and said screw conveyor are mounted on a common drive shaft for rotation together at the same rate.

* * * * *